United States Patent [19]
Ackeret

[11] Patent Number: 4,770,474
[45] Date of Patent: Sep. 13, 1988

[54] STORAGE CONTAINER FOR COMPACT DISCS

[75] Inventor: Peter Ackeret, Kusnacht, Switzerland

[73] Assignee: IDN Invention and Development of Novelties AG, Chur, Switzerland

[21] Appl. No.: 943,556

[22] Filed: Dec. 18, 1986

[30] Foreign Application Priority Data

Dec. 20, 1985 [DE] Fed. Rep. of Germany ....... 3545163

[51] Int. Cl.$^4$ ............................................. A47B 81/06
[52] U.S. Cl. .................... 312/13; 312/319; 206/387
[58] Field of Search ............... 206/387; 312/10, 12, 312/13, 14, 18, 319

[56] References Cited

U.S. PATENT DOCUMENTS

| | | |
|---|---|---|
| 1,306,737 | 6/1919 | Banschbach ........................ 312/13 |
| 3,084,983 | 4/1983 | Staurt ................................. 312/13 |
| 3,093,428 | 6/1963 | Lanier ............................. 312/13 X |
| 3,864,755 | 2/1975 | Hargis ............................ 206/387 X |
| 4,330,161 | 5/1982 | Khawand ....................... 312/13 X |
| 4,592,600 | 6/1986 | Bohnet et al. ........................ 312/12 |
| 4,664,454 | 5/1987 | Schatteman et al. ................ 312/13 |

Primary Examiner—Joseph Falk
Attorney, Agent, or Firm—Chilton, Alix & Van Kirk

[57] ABSTRACT

A storage container intended particularly for compact discs storage in motor vehicles. For each disc there is provided a holder which may be pivoted out of the housing, the front wall of which holder in the pivoted-out position hinges down to such an extent that the disc can be gripped pincer-fashion and, unhampered by the front wall, can be pulled out or inserted. In the preferred embodiment, the holder is biased by a spring into its pivoted-out position and there is also preferably provided a front wall assembly that is biased by a spring into the hinged-down position.

40 Claims, 8 Drawing Sheets

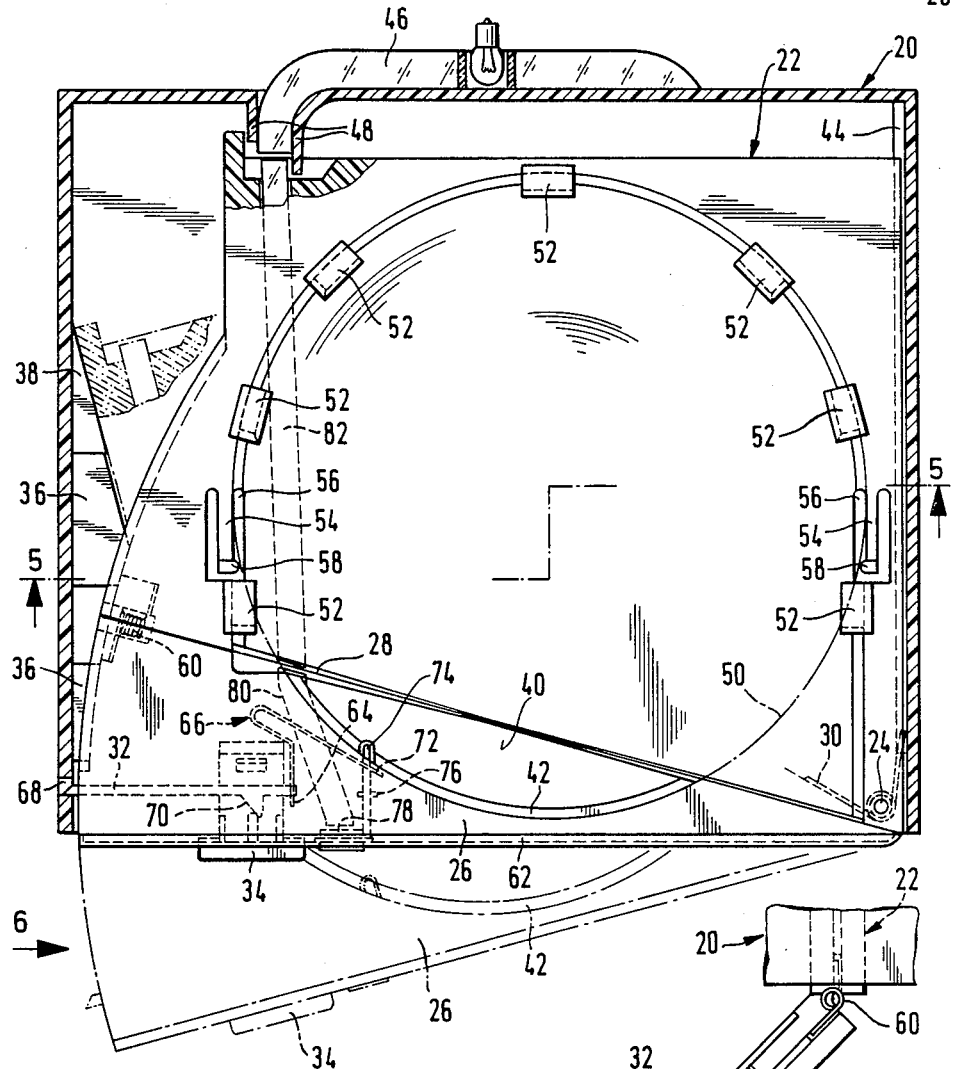

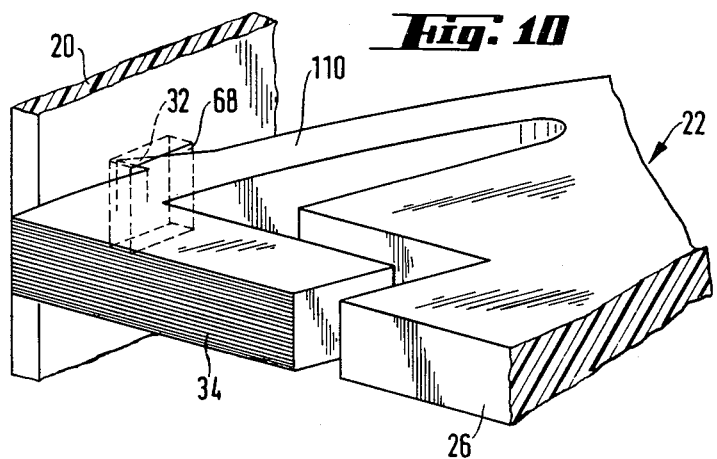
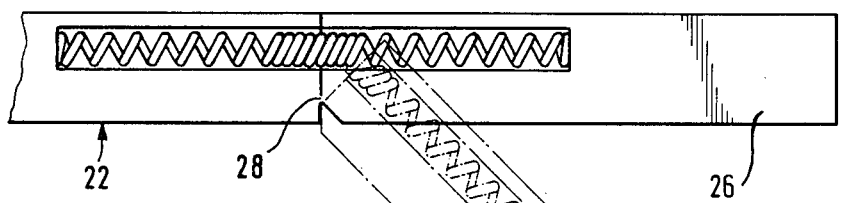
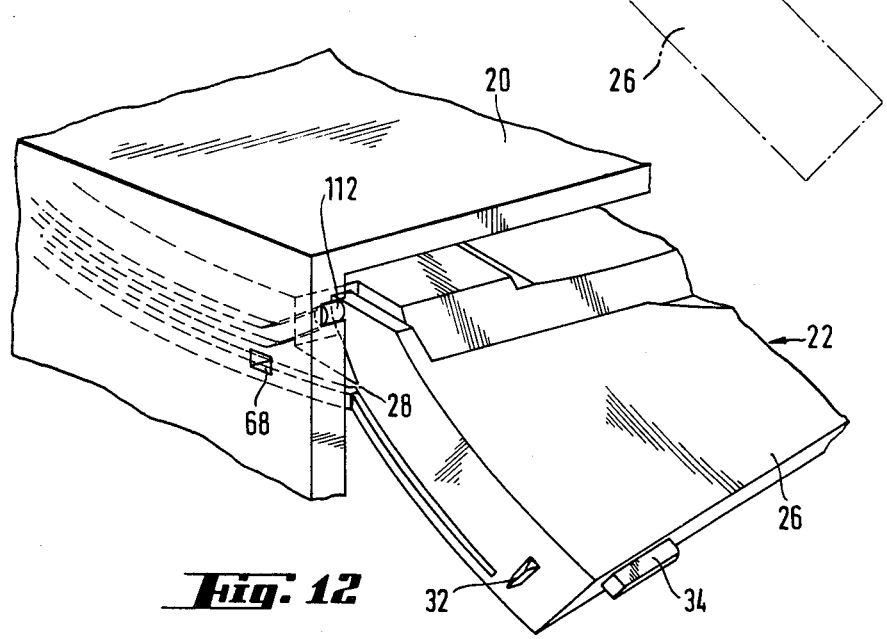

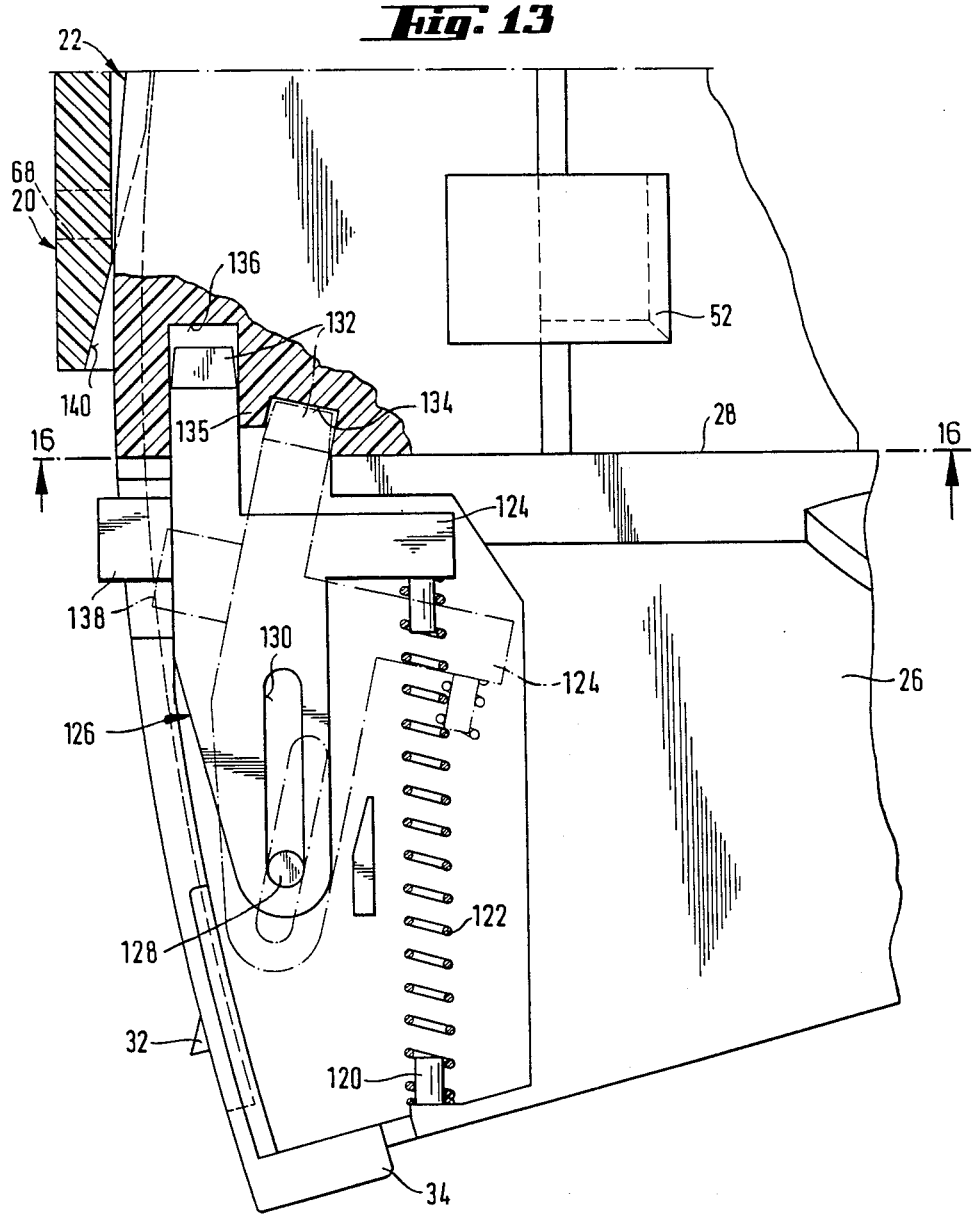

STORAGE CONTAINER FOR COMPACT DISCS

BACKGROUND AND SUMMARY OF THE INVENTION

The invention relates to a storage container for disc-shaped recording media, such as phonograph or video discs, and is intended and suitable for compact, i.e., optical information storage, discs in particular.

The present invention is an improvement of the conventional container of the type disclosed in French Patent Specification No. 685 404. This known container is constructed as a chest, wherein a hinged lid may cover the storage space. This type of construction is relatively bulky and awkward to operate, and the invention is therefore based on the problem of producing a container of this type which is so easy to operate and takes up such a small amount of space that it is suitable for use in motor vehicles for operation by the vehicle driver.

The solution according to the invention is provided by a front wall assembly which, when the holder has been pivoted-out, is displaced into a oblique position relative to the housing enabling the recording media to be removed, the front wall assemblies of all of the holders in a housing cooperating to cover the front opening of the housing through which the holders move when pivoting between the inserted and disc removal positions thereof.

It should be noted that a container for compact discs which is intended and suitable for use in motor vehicles is already known from Published European Patent Application No. 0139161. This container has holders that undergo translatory movement, however, and which are biased into their removal position by an arrangement of springs. The space requirement in the depth direction is thereby increased.

BRIEF DESCRIPTION OF THE DRAWINGS

Embodiments of the subject of the invention are described in detail below with reference to the accompanying drawings, in which:

FIG. 4 shows in section, parallel to the principal plane of a compact disc to be stored, a further embodiment of a container according to the invention;

FIG. 5 is a section along line 5—5 of FIG 4;

FIG. 6 is a partial sectional view following arrow 6 in FIG. 4;

FIG. 10 shows in a perspective view a detail of the system according to FIGS. 8 and 9;

FIG. 11 shows in section similar to FIG. 7 a further variation;

FIG. 12 shows a perspective view of a further variation; and

FIGS. 13 to 16 show a last variation in various views and sections.

DESCRIPTION OF THE PREFERRED EMBODIMENTS

Figure 1:
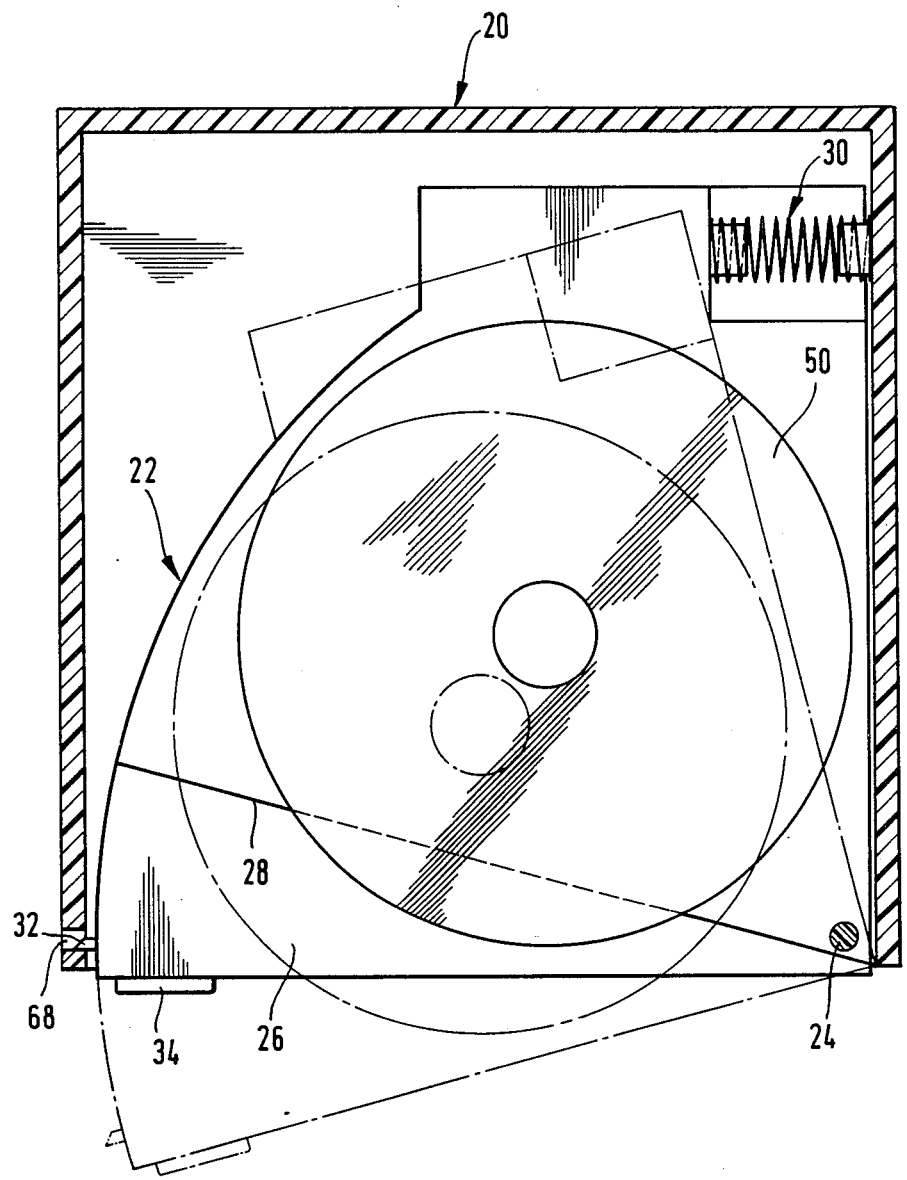
FIGS. 1 to 3 show in a diagrammatic form three possible embodiments.
Figure 2:
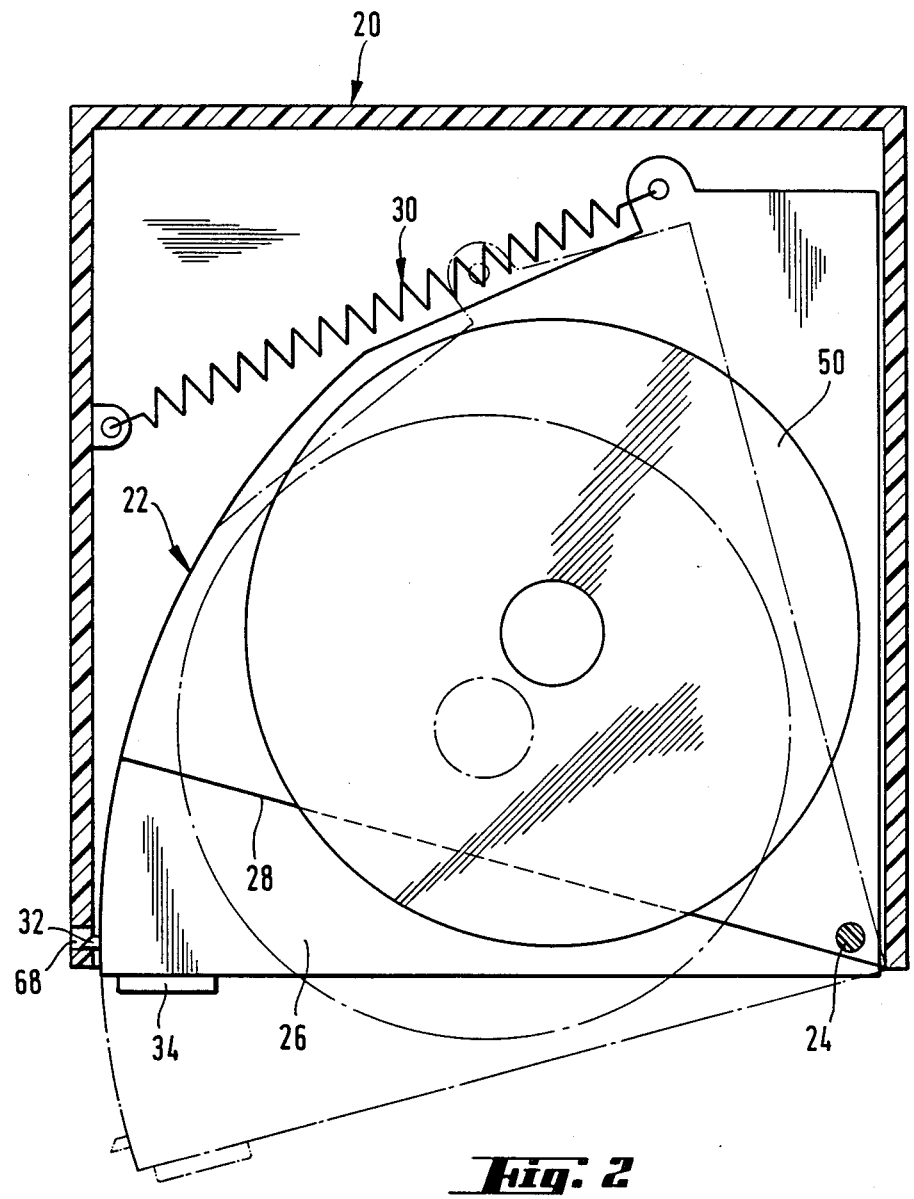
Figure 3:
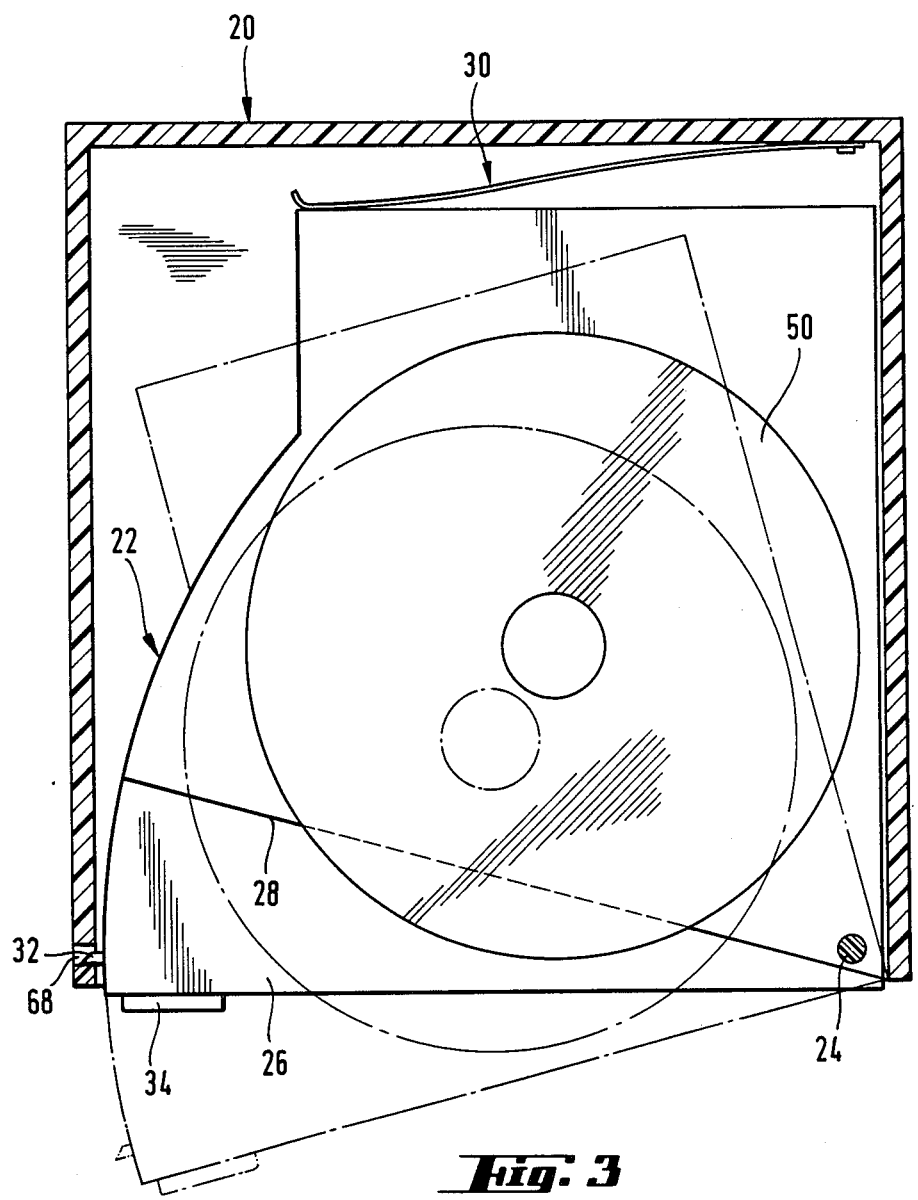

FIGS. 1, 2, and 3 each show diagrammatically a section through a container compartment parallel to the principal plane of a compact disc to be stored (hereinafter referred to merely as "disc"). Each container comprises a housing 20 for a disc holder 22, which is pivotable about a bearing pin 24 arranged in the housing on an axis perpendicular to the principal plane defined by the stored disc. The housing may preferably also accommodate a plurality of holders parallel to one another. The pivot angle is limited by stop members (not shown in FIGS. 1 to 3). Each holder is provided with a front wall assembly 26 which covers the housing opening when the holder has been pivoted in to the storage position. When the holder has been pivoted out of the storage position to the ejected or removal position. The front wall assembly 26 can be hinged obliquely away from the principal plane about another axis 28 which is preferably parallel to the principal plane. Each holder is biased by a spring arrangement 30 into the ejected position and is held against the bias in the storage position by a locking arrangement 32, which is releasable by means of a manually operable button 34.

The three forms of embodiment shown in FIGS. 1 to 3 differ in the construction of the spring arrangement. In FIG. 1, the spring arrangement 30 is embodied by a helical compression spring, in FIG. 2 by a helical tension spring, and in FIG. 3 by a leaf spring. It is obvious that the space requirement for the combination of holder and spring has been shown on an exaggerated scale in FIGS. 1 to 3; in reality the space requirement is substantially less. An especially compact construction is produced by the use of a coiled torsion spring 30 with projecting ends, as illustrated in FIGS. 4 to 7.

The housing 20, holder 22, pin 24, front wall assembly 26, axis 28, spring arrangement 30, locking assembly 32 and release button 34 can also be seen in FIGS. 4-7.

Referring now to FIGS. 4-7, the spring arrangement is in the form of a coiled torsion spring 30 with projecting ends, one end of which is braced against a side wall of the housing while the other end acts on the holder 22. The holder is shown in its storage position by a solid line, while the removal position is indicated merely at separate places by a broken line. The holder 22 is disc-shaped and is supported opposite the pin 24 by inwardly projecting guide elements 36 molded on the housing 20. The outward pivoting movement of holder 22 is limited by a stop member 38 provided in the housing next to the guide elements. The axis 28 about which the front wall assembly may be pivoted independently of the movement of the holder extends, when the holder has been pivoted to the removal position, immediately in front of the housing and parallel to front edges thereof. The holder 22 is concavely recessed, as apparent from FIG. 5, so that a disc positioned thereon cannot become scratched in its recording region either in its storage position or during removal or insertion i.e., only the edge region of the disc contacts the holder. The sector-shaped bottom part 40 of the front wall assembly 26 similarly supports the disc only with its upright annular portion 42.

On the inside of the housing opposite the guide elements 36 there is molded a support rail 44 for the holder, and a light guide 46 protrudes through the rear side of the housing into the interior, and is held and screened by inwardly projecting sleeve-like parts of the housing. A light source causes the outlet of the light guide 46 in the interior of the housing to be illuminated.

The disc 50 is held safely on the holder by holding-down members 52 molded on the holder which engage over the disc. Also molded on the holder are two resilient tongues 54 which are able to deflect resiliently outwards, by virtue of cutouts 56 in the base of the holder, as the disc is removed or inserted, and which likewise engage the disc via holding-down members 58. As the holder is pivoted outwards the members 58 check the disc so that it is not hurled out and, as the holder is pushed in, once half of the disc has passed the members 58 they exert an inwardly directed force on the disc whereby it is "sucked" into the predetermined rest position.

A further coiled torsion spring 60 with projecting ends biases the front wall assembly 26 into its swung away or opened position which is determined by stop members. The opened position of the front wall assembly 26 permits movement of the disc past the actual front wall 62 of front wall assembly 26 and also permits the pivoted-out segment of the disc to be gripped at both sides, pincer fashion.

In the holder, opposite the pin 24, a detent 32 is mounted so as to be displaceable parallel to the front wall 62. Detents 32 is biased by one arm 64 of a wire spring 66 anchored in the holder into the extended position in which the detent locks in an opening 68 in the side wall of the housing. The detent has a wedge face 70 which may be engaged by the button 34 by pushing in the button to release the holder. A second arm 72 of the wire spring biases a feeler 74 into a position in which its free end projects into the space occupied by an inserted disc. The feeler is pivotable about a hinge 76 and is rotated against the spring bias by the insertion of a disc. Rotation of filler 74 actuates a stop 78, joined to it, in front of the light outlet of a light guide 80 which is installed in the front wall assembly 26 and is illuminated by a further light guide 82 located in the holder and which in turn receives light from the light guide 46. The position and cross-section of the light guides are apparent from FIG. 5. In front of the stop the front wall has a through-opening so that, depending on the position of the stop, it is possible to recognize whether the holder in question is occupied by a disc or is empty.

Figure 7:
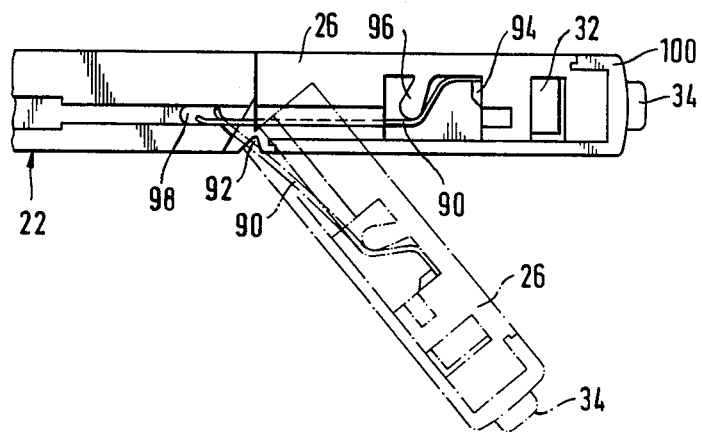
FIG. 7 is a section through the locking assembly from FIG. 4 on an enlarged scale compared with FIG. 6.

Instead of the coiled torsion spring 60 with projecting ends, the leaf spring 90 discernible in FIG. 7 can be used. This Figure also shows the hinge 92 which joins the front wall assembly to the holder; the holder and the front wall assembly are injection-molded in one piece from a plastics material, which enables the hinge to be constructed as a so-called web hinge. This construction preferably applies to all the embodiments described. The leaf spring 90 is fixed at one end beneath a projection 94 in a recess which extends from below into the front wall assembly, bent over a supporting part 96, inserted in a slot 98 of the holder. In the hinged-down state it is simultaneously the stop member for limiting the pivot angle. The recess in the front wall assembly is closed off by a snap-on decorative fascia 100 which has an opening for the button 34.

Figure 8:
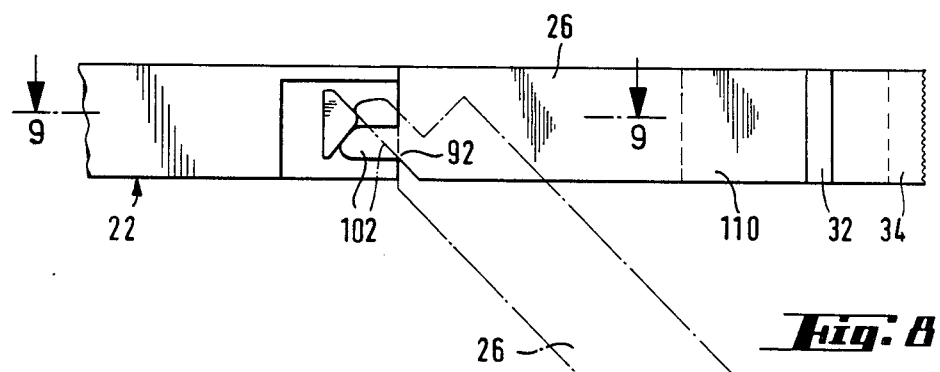
FIG. 8 shows an alternative, simplified configuration in a form analogous to FIG. 7.
Figure 9:
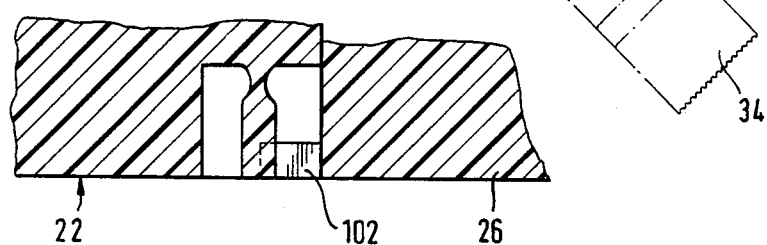
FIG. 9 is a section along 9 line 9—9 of FIG. 8.

In the embodiments so far described, the front wall assembly is biased into the hinged-down position. To stow away a disc, the disc is pushed into the outwardly pivoted holder and the user then has to lift the front wall assembly by hand, wherein the position in which it is aligned with the guide mechanism is advantageously defined by a stop arrangement, and then push in the holder. In the embodiment shown in FIGS. 8 and 9, the front wall assembly is hinged down and hinged back up again manually, in so doing displacing with an integrally molded cam 102 a resilient lever molded on the holder.

FIG. 11 shows a further possibility for biasing the front wall assembly by means of an embedded helical compression spring, the winding of which in the hinge region lie close together in order to suppress scraping noises.

FIG. 10 illustrates a simplified locking arrangement in which the detent 32 and the button 34 are molded from the material of the front wall assembly and are located on an arm 110 which may be displaced resiliently inwards. This design may, for example, be combined with the biasing arrangement shown in FIGS. 8 and 9.

Instead of an integral biasing spring, the movement of hinging down the front wall assembly may also be brought about by the pivoting-out spring 30, in that its force is transferred via positive-action control means 112 to the front wall assembly, as indicated in FIG. 12.

Finally, FIGS. 13 to 17 show an embodiment in which the front wall assembly is pivoted by a spring into the hinged down position as the holder is pivoted outwards, for instance corresponding to the construction shown in FIG. 7. However, in this case provision is made for the front wall assembly to be hinged up again manually and held in this position until the holder is pivoted back into its storage position.

Figure 14:
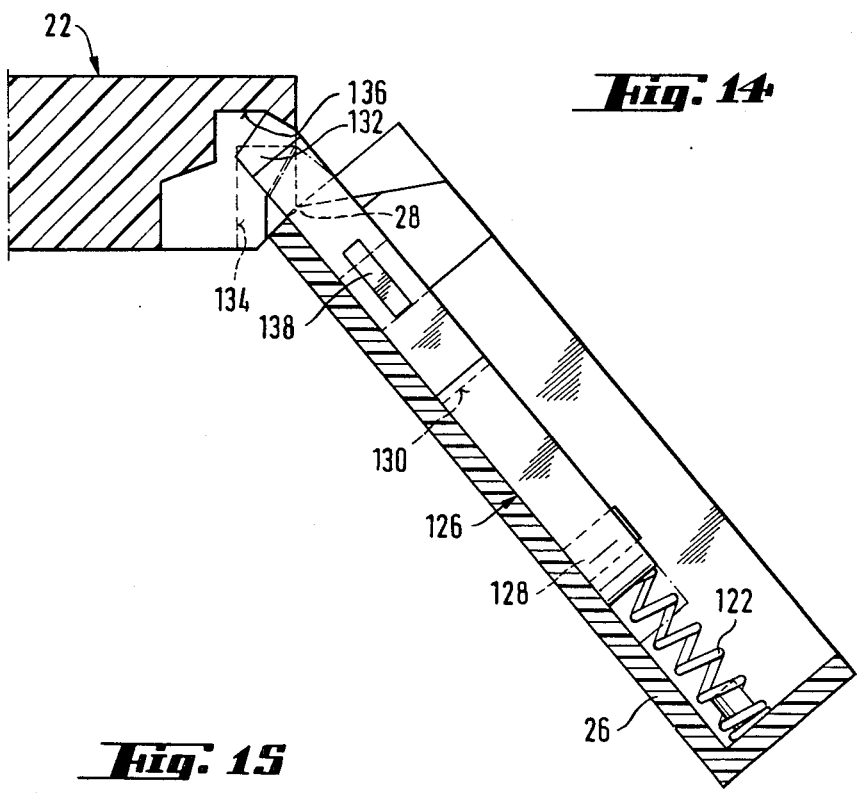
Figure 15:
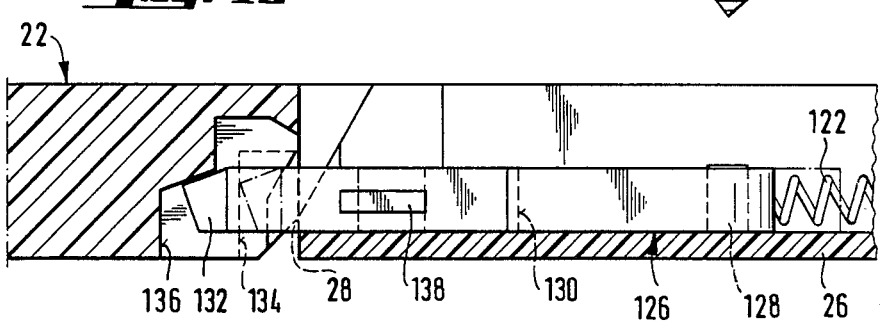
Figure 16:
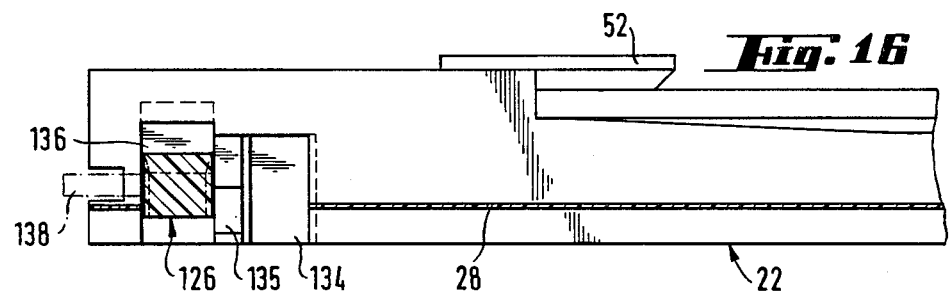

According to FIG. 13, which illustrates a view from below onto the front wall assembly, close to the actual front wall there is molded a pin 120, on which one end of a helical compression spring 122 is mounted. This spring engages an arm 124 of the multi-arm lever 126 which is pivotable about a fixed pivot point 128 and is displaceable in a translatory manner along this pivot point by virtue of its slot 130. In the starting position, the lever is held in the position shown by dashed lines in FIGS. 13 to 16, because its end 132 is anchored in a recess 134. At the end of the hinging down movement—denoted by solid lines in FIGS. 13 to 16—the lever end 132 is able to pivot past the separator bar 135 under the laterally directed force component of the spring and drop with an over the center effect into the recess 136, the lever being displaced along its slot on the pivot pin. In this position the lever end simultaneously serves as an end stop for the swinging movement (FIG. 14). By hinging up the front wall assembly manually, the lever is moved into the position shown in FIG. 15, in which the base section of the front wall assembly is aligned with the holder face. If in this position the front wall assembly is accidentally hinged down again, the lever is able to give, since pressure acting on its adjacent wedge face is converted into a corresponding displacement of the lever. As the holder is pivoted in, the arm 138 of the lever runs onto the slope 140 on the housing, is pivoted about the pivot point and assumes its starting position again.

I claim:

1. A storage container for recording discs, each disc having two parallel planar faces, the container comprising:

a housing having a front which defines a reference plane, said housing front also defining an access opening for the container;

a plurality of disc holders mounted in said housing for pivotal motion about a common first axis, said holders being mounted such that the two planar faces of a disc supported on a holder extend substantially orthogonal relative to said reference plane, each disc holder being displaceable through the access opening from a disc storage position within said housing to a disc removal position wherein the holder is positioned partly out of the housing, the said displacement being accomplished by pivoting movement about said first axis, said first axis extending substantially parallel to said reference plane;

stop means for defining said removal position, said stop means being configured such that only a segment of a disc on a holder extends beyond said reference plane when the holder is in the removal position, the said segment being of sufficient size to permit grasping and withdrawal of the disc from the holder;

each holder having a front wall assembly which, when the holder is in the removal position, is displaceable about a second axis extending substantially parallel to said reference plane and orthogonal to said first axis so that both of the planar faces of the said disc segment are freely accessible; and wherein the said front wall assemblies of all of said disc holders cooperate to form a cover for said housing front opening when all holders are in the storage position.

2. A container according to claim 1, further characterized in that the holders are generally of disc-shaped construction spanning substantially the inside width of the housing front opening.

3. A container according to claim 2 wherein the reference plane is vertical, further characterized in that the front wall assemblies are pivotally attached to their respective holders and the direction of displacement is downward.

4. A container according to claim 3 further characterized in that each of the front wall assemblies is attached to its respective holder by means of an integrally molded hinge.

5. A container according to claim 3 further characterized in that each front wall assembly comprises a ridge-like upright front wall, joined to a base section that is in the shape of a sector of a circle, and the point of attachment to the holder is located close to the housing front opening.

6. A container according to claim 3 further characterized in that the displaced position of the front wall assemblies is defined by stop members.

7. A container according to claim 3 further characterized in that the front wall assembly is moved positively into its displaced position when its associated holder is pivoted to the removal position.

8. A container according to claim 7 further characterized by biasing means for causing the said downward displacement of each front wall assembly.

9. A container according to claim 8, wherein the biasing means is a leaf spring.

10. A container according to claim 8, wherein the biasing means is a helical compression spring.

11. A container according to claim 8, wherein the biasing means is a helical tension spring.

12. A container according to claim 8, wherein the biasing means is a coiled torsion spring with projecting ends.

13. A container according to claim 8 further characterized by locking means for holding each front wall assembly in the downwardly displaced position.

14. A container according to claim 7 further characterized by first means for biasing each holder into the removal position, and second means for transferring the bias of said first biasing means to the front wall assembly to effectuate the downward displacement thereof.

15. A container according to claim 3 further characterized in that in the removal position of a holder its associated front wall assembly has two stable end positions determined by spring means with an over-center effect, said spring means biasing the front wall assembly into each of its two stable end positions, and said container further comprises means for manually moving the front wall assembly out of one end position and into the other end position.

16. A container according to claim 2 further characterized in that each holder is provided with means for holding down a recording disc.

17. A container according to claim 16 further characterized in that at least one of the holding-down means is disposed on an arm that yields resiliently outwards transversely to the insertion direction of the disc.

18. A container according to claim 17, further characterized in that the resilient arm exerts an inwardly directed force on the disc after insertion of the disc into the holder by more than half of its diameter.

19. A container according to claim 1 further characterized in that the housing has a plurality of side walls and the holders are pivotable about a first axis located adjacent to the front opening of the housing and adjacent to one side wall of the housing.

20. A container according to claim 19 further characterized in that the holders each have an end edge remote from the pivot axis and guide means fixed in the housing are provided for guiding said end edge during the pivoting movement of the holder.

21. A container according to claim 20 further characterized in that the holder front wall assemblies have a front wall projecting from a sector-shaped floor section, and the floor sections are likewise pivotally guided in the housing during movement of the holders about said first axis.

22. A container according to claim 20 further characterized in that the holders have a concavely recessed base surface and the floor section of the front wall assembly of each holder supports a stored recording disc only in its edge region.

23. A container according to claim 19, further characterized by a rail fixed in the housing for supporting each holder in its stored position.

24. A container according to claim 1 further characterized in that the holders have a concavely recessed base surface.

25. A container according to claim 1 further characterized by spring means for biasing the holders toward the removal position, and manually releasable locking means for securing each holder in its stored position against the bias of said spring means.

26. A container according to claim 25, wherein the spring means is a helical compression spring.

27. A container according to claim 25, wherein the spring means is a helical tension spring.

28. A container according to claim 25, where the spring means is a leaf spring.

29. A container according to claim 25, wherein the spring means is a coiled torsion spring with projecting ends.

30. A container according to claim 29, further characterized in that the coiled torsion spring with projecting ends sits with its coil on a bearing-pin for the pivotal movement of the holder.

31. A container according to claim 25 further characterized in that each holder front wall assembly includes a detent and a button operable from outside the front wall assembly for displacing the detent, and wherein the housing includes catch means for engaging the detent whereby the detent may be disengaged from the catch means by actuation of the button.

32. A container according to claim 31, further characterized in that the detent is incorporated in the front wall assembly so that it is displaceable substantially parallel to said second axis.

33. A container according to claim 31, further characterized by means for biasing the detent into its locking position.

34. A container according to claim 31, further characterized in that the detent and the button are molded on the front wall assembly, so that they yield resiliently with respect to the remainder of the front wall assembly.

35. A container according to claim 25, further characterized in that indicating means are associated with the outside of each front wall assembly for indicating whether a holder which has been pivoted into the housing holds a recording disc.

36. A container according to claim 35, further characterized in that the indicating means includes a feeler projecting into the storage space for the recording disc, the feeler being displaceable by the insertion of the disc and arranged to switch over an optical indicating display.

37. A container according to claim 36, further characterized in that the optical indicating display includes a light guide and associated display window, and wherein the feeler actuates a stop interrupting or passing the flow of light to the window.

38. A container according to claim 35 further characterized by a light source carried by the container for illuminating an indicator window in the front wall assembly, and means for modulating the light passing through the window in dependence on whether the holder contains a recording disc.

39. A container according to claim 38 further characterized in that the light source is arranged outside of the housing and light guide means are provided for transmission of light from said source to the indicator window.

40. A container according to claim 39 wherein said light guide means are at least in part disposed in the holder.

* * * * *